United States Patent [19]
Wakerly

[11] Patent Number: 5,577,229
[45] Date of Patent: Nov. 19, 1996

[54] COMPUTER SYSTEM AND METHOD FOR PIPELINED TRANSFER OF DATA BETWEEN MODULES UTILIZING A SHARED MEMORY AND A PIPELINE HAVING A PLURALITY OF REGISTERS

[75] Inventor: John F. Wakerly, Mountain View, Calif.

[73] Assignee: Alantec Corporation, San Jose, Calif.

[21] Appl. No.: 359,112

[22] Filed: Dec. 19, 1994

Related U.S. Application Data

[62] Division of Ser. No. 276,877, Jul. 18, 1994, Pat. No. 5,444,858, which is a continuation of Ser. No. 964,180, Oct. 19, 1992, abandoned, which is a division of Ser. No. 304,053, Jan. 30, 1989, Pat. No. 5,237,670.

[51] Int. Cl.⁶ .......................... G06F 12/00; G06F 13/00; G06F 13/38
[52] U.S. Cl. .......................... 395/474; 395/476; 395/477; 395/495; 395/496; 395/200.07; 395/200.08; 395/290; 395/840; 364/DIG. 1; 364/DIG. 2; 364/228.1; 364/230.4; 364/231.8; 364/244.8; 364/931.44; 364/931.46; 364/948.3; 364/948.31; 364/948.34; 364/965.9
[58] Field of Search .................... 395/425, 325, 395/550, 400, 275, 458, 474, 475, 476, 477, 494, 495, 496, 405, 200.07, 200.08, 842, 840, 872, 287, 290

[56] References Cited

U.S. PATENT DOCUMENTS

| | | | |
|---|---|---|---|
| 3,970,997 | 7/1976 | Daly et al. | 395/880 |
| 4,470,114 | 9/1984 | Gerhold | 395/291 |
| 4,685,088 | 8/1987 | Iannucci | 365/189.02 |
| 4,780,812 | 10/1988 | Freestone et al. | 395/476 |
| 4,937,781 | 6/1990 | Lee et al. | 395/476 |
| 5,045,993 | 9/1991 | Murakami et al. | 395/375 |
| 5,109,490 | 4/1992 | Arimilli et al. | 395/290 |
| 5,136,717 | 8/1992 | Morley et al. | 395/800 |
| 5,235,595 | 8/1993 | O'Dowd | 370/94.1 |
| 5,438,666 | 8/1995 | Craft et al. | 395/842 |

Primary Examiner—Glenn Gossage
Attorney, Agent, or Firm—Skjerven, Morrill, MacPherson, Franklin & Friel; Michael Shenker

[57] ABSTRACT

A computer system and method for transferring data from a first memory to a second memory of a computer system are disclosed. The computer system includes a bus for transferring data between a first module and a second module, at least one of the modules including a shared memory having multiple ports. One port of each shared memory communicates with the bus through a pipeline which includes a plurality of registers connected in series. The pipeline allows shifting data in the registers by one register and loading data from the input of the pipeline into a first one of the registers. An access to one of the shared memories through one port is allowed to proceed simultaneously with a portion of a data transfer between the memories which includes a data transfer through another port and pipeline. The pipelines thus allow shared memories to communicate even when the memories are not simultaneously available for communication with each other.

40 Claims, 17 Drawing Sheets

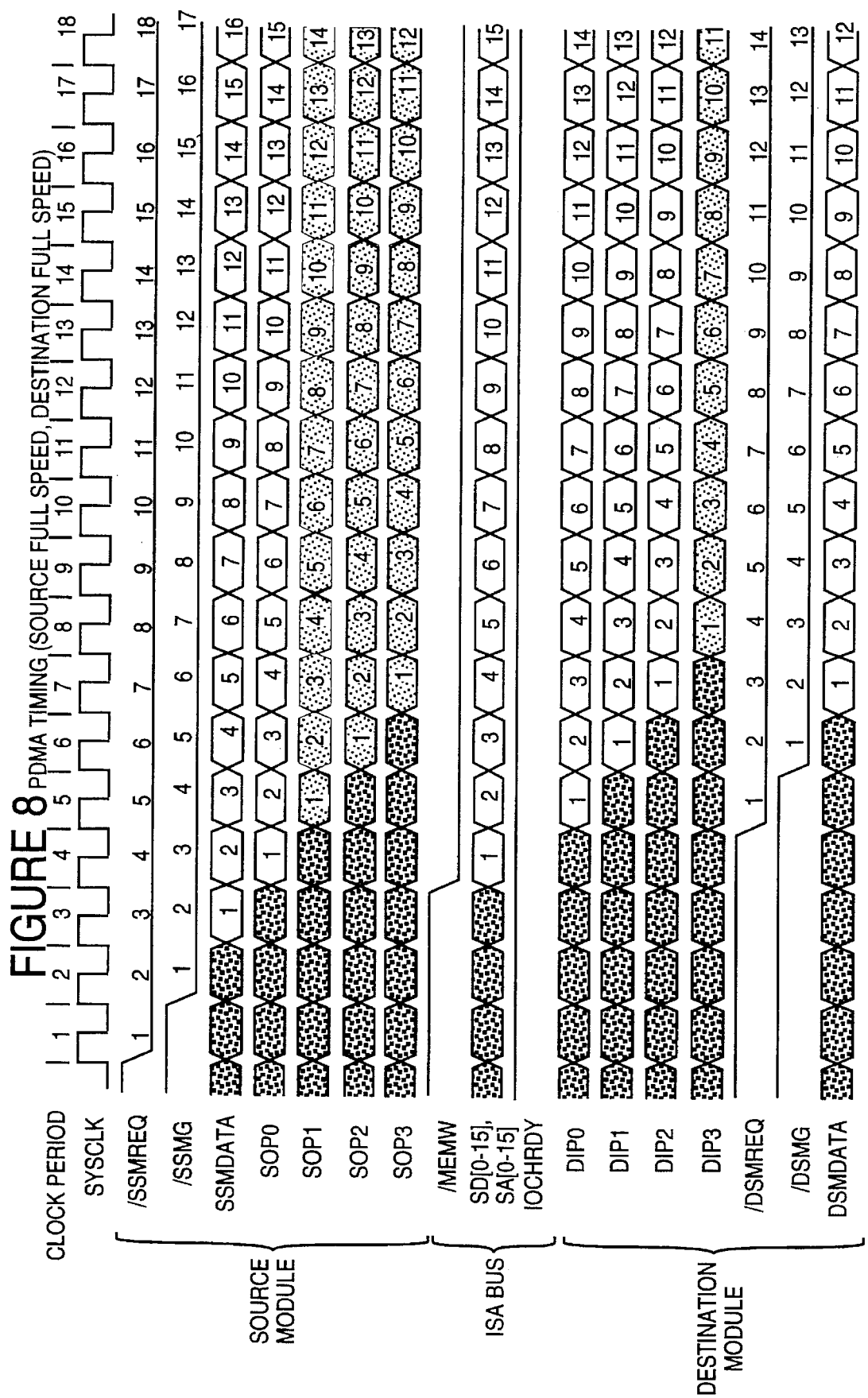

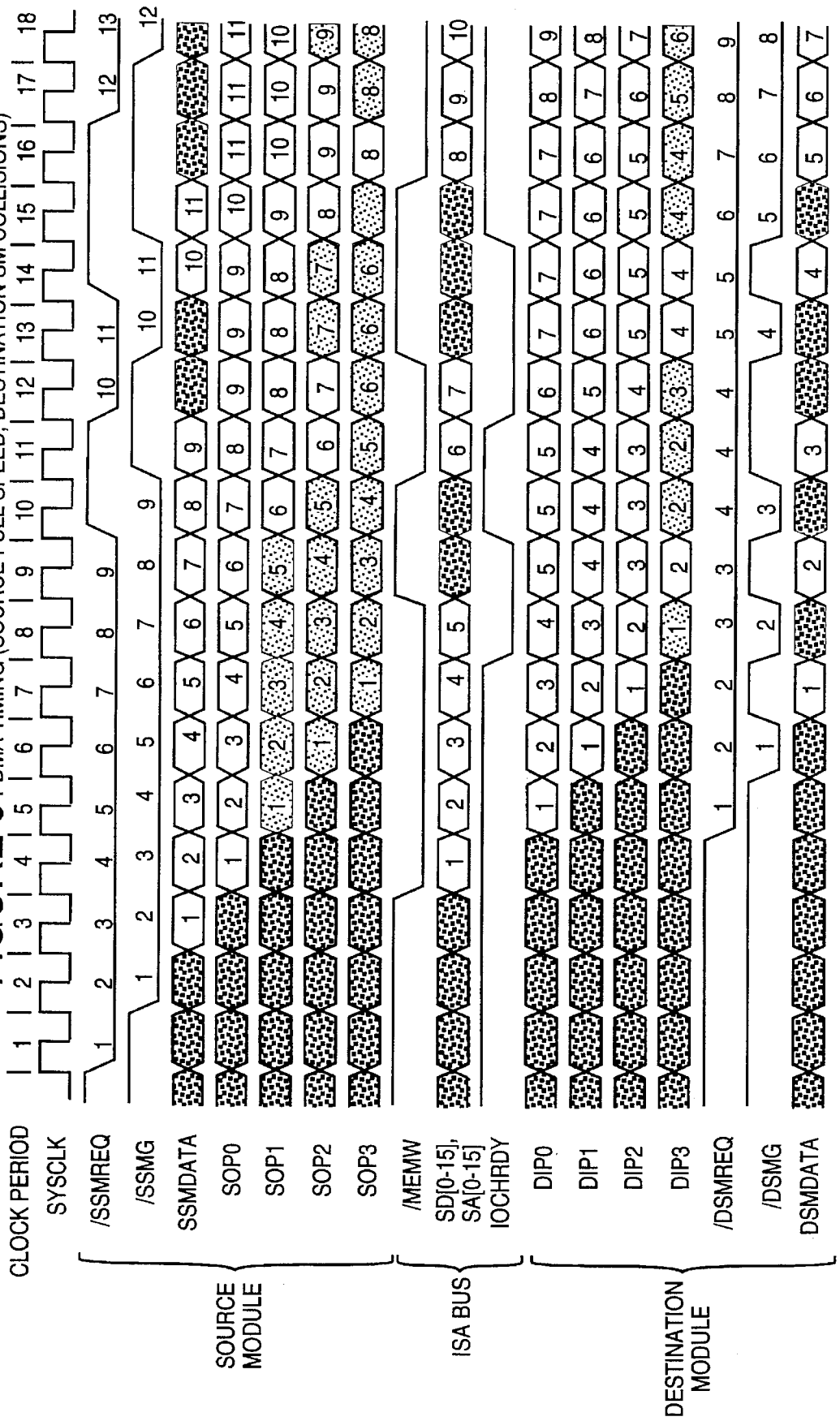
FIGURE 9 PDMA TIMING (SOURCE FULL SPEED, DESTINATION SM COLLISIONS)

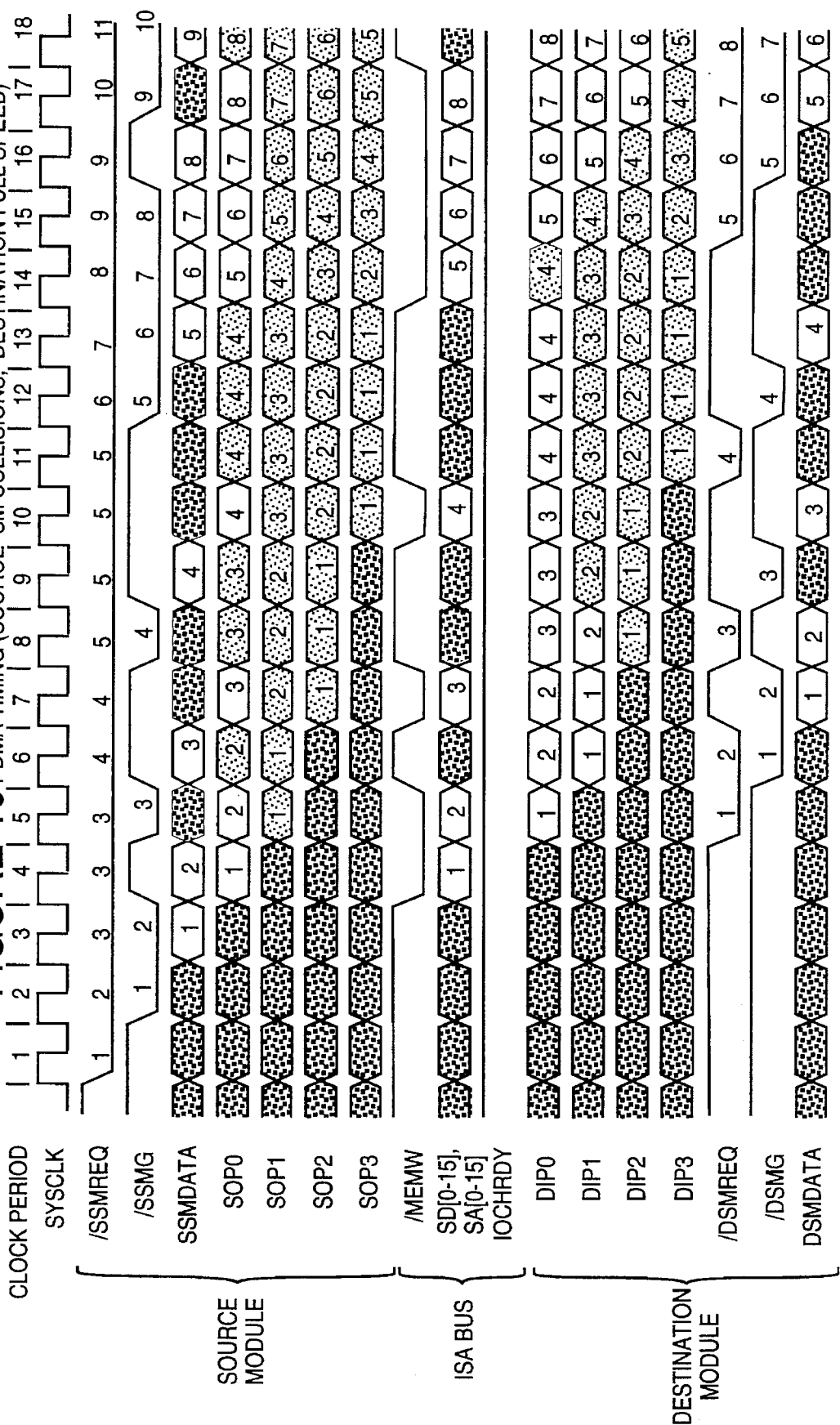

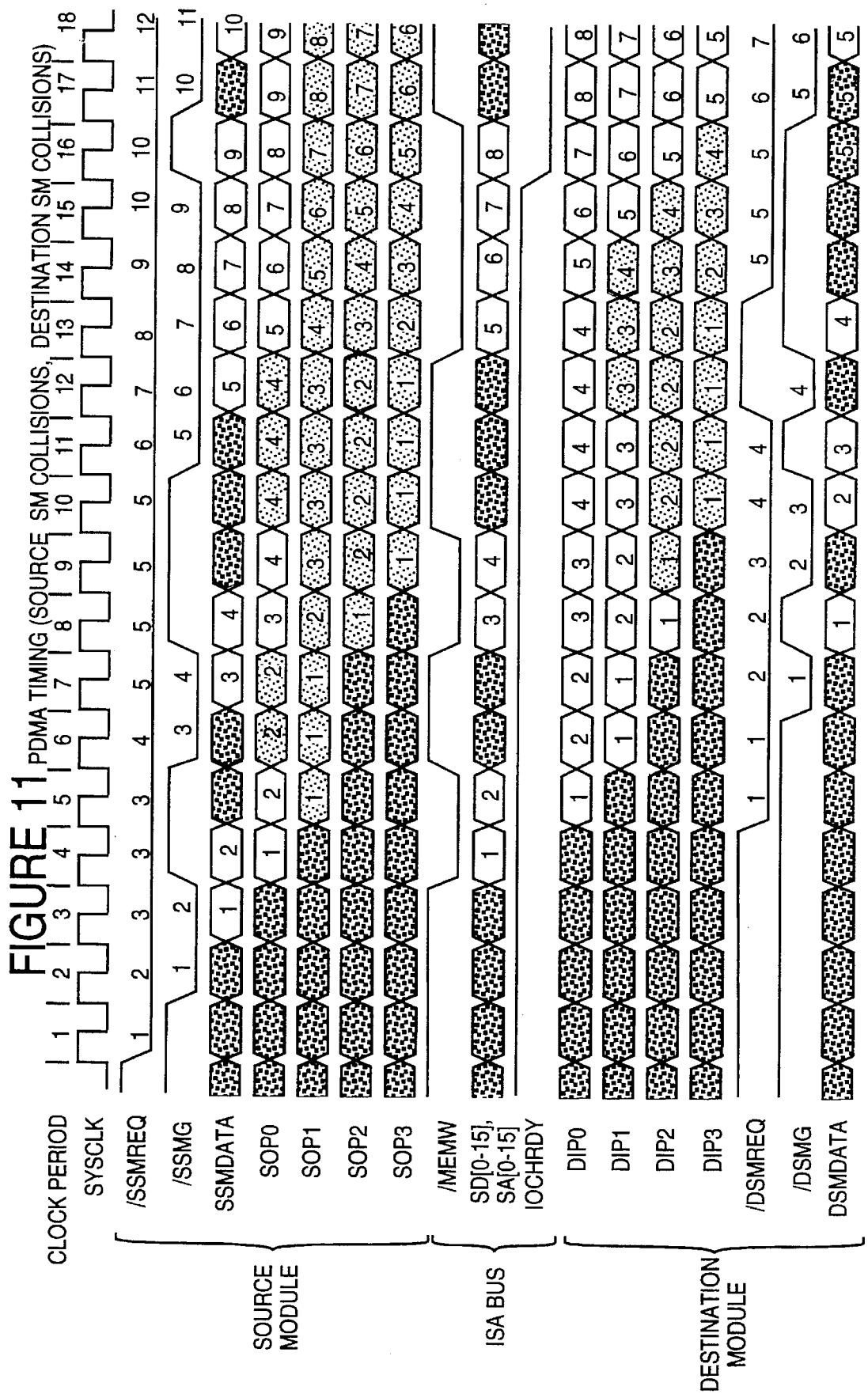

```
module SPIPE;
title 'PDMA Source Pipeline Control Logic
_SPIPE device 'P16R6';
```

"Input signals. Pin assignments may be changed"

```
SCLK          pin 1;
ENB_SPDMA     pin 2;    "This signal is provided by external control logic
                        " and is active only when source PDMA is enabled
IOCHRDY       pin 3;
!SSMG         pin 4;
```

"Output signals. Pin assignments may be changed."

```
!SSMREQ       pin 19;
!SPMT         pin 18;
SPS0,SPS1     pin 17, 16;
!SPSHIFT      pin 15;
!MEMW         pin 14;
```

"Field and expression definitions"
SPS = [SPS1,SPS0];

"       SPS is an up/down counter that keeps track of the state of
"       the source pipe as a number in the range 0-3.. When SPS=0,
"       the pipe is empty or has one item (these two cases are
"       distinguished by SPMT). When SPS=3, the pipe is full.
"       Externally, SPS controls the output multiplexer of the
"       pipeline. When SPS=0, the first register in the pipeline
"       is selected. When SPS=1, the second register in the
"       pipeline is selected, and so on.

"       The following expressions define when to increment or
"       decrement the SPS counter.

CNTUP = (SPSHIFT & !MEMW);   " Got a new word from SM and not
                             " getting rid of one by writing on bus.
CNTDN = (!SPSHFT & MEMW);    " Getting rid of a word by writing on
                             " bus, and not getting a new one from SM.
CNTHOLD = (!CNTUP & !CNTDN);" No net change in # of words in pipe.

"       The following are the four possible values of SPS.

CNT0 = [0,0];
CNT1 = [0,1];
CNT2 = [1,0];
CNT3 = [1,1];

FIGURE 12A equations

SPSHIFT     := ENB_SPDMA & SSMG         " Got a source PDMA grant from SM.

SPMT  := !ENB_SPDMA                     " Default -- pipe empty if not doing PDMA.
        # SPMT & !SPSHIFT               " Pipe already empty, and nothing new.
        # (SPS == 0) & MEMW & !SPSHIFT;
                                        " Pipe is about to become empty.

MEMW  := IOCHRDY & SPSHIFT              " Will have something in pipe to write.
        # IOCHRDY & ! (SPS == 0)        " At least two items in pipe.
        # IOCHRDY & !SPMT & (SPS == 0) & !MEMW;
                                        " One item in pipe, not currently being written.

SPS     := CNT0 & !ENB_SPDMA
        # CNT0 & ENB_SPDMA & (SPCNT == 0) & (!CNTUP # SPMT)
        # CNT0 & ENB_SPDMA & (SPCNT == 1) & CNTDN
        # CNT1 & ENB_SPDMA & (SPCNT == 0) & CNTUP & !SPMT
        # CNT1 & ENB_SPDMA & (SPCNT == 1) & CNTHOLD
        # CNT1 & ENB_SPDMA & (SPCNT == 2) & CNTDN
        # CNT2 & ENB_SPDMA & (SPCNT == 1) & CNTUP
        # CNT2 & ENB_SPDMA & (SPCNT == 2) & CNTHOLD
        # CNT2 & ENB_SPDMA & (SPCNT == 3) & CNTDN
        # CNT3 & ENB_SPDMA & (SPCNT == 2) & CNTUP
        # CNT3 & ENB_SPDMA & (SPCNT == 3) & !CNTDN;

SSMREQ = ENB_SPDMA & (SPS ==0)
                " 3 or 4 unused words left in source pipe.
        # ENB_SPDMA & (SPS == 1) & MEMW
                " 2 words left, and getting another this cycle.
        # ENB_SPDMA & (SPS == 1) & !SPSHIFT
                " 2 words left, and not using one this cycle.
        # ENB_SPDMA & (SPS == 1) & !SSMG
                " 2 words left, and not using one next cycle.
        # ENB_SPDMA & (SPS ==2) & MEMW & !SPSHIFT;
                " 1 word left, getting another, and not using one this cycle.
        # ENB_SPDMA & (SPS == 2) & MEMW & !SSMG
                " 1 word left, getting another, and not using one next cycle.
        # ENB_SPDMA & (SPS == 2) & !SPSHIFT & !SSMG
                " 1 word left, and not using one this cycle or next.
        # ENB_SPDMA & (SPS == 3) & MEMW & !SPSHIFT & !SSMG
                " 0 words left, but getting one this cycle,
                "      and not using one this cycle or next.

end SPIPE;

FIGURE 12B

```
module DPIPE;
title 'PDMA Destination Pipe Controller
_DPIPE device 'P16R4';
```

"Input signals. Pin assignments may be changed."

```
SCLK          pin 1;
ENB_DPDMA     pin 2;          " This signal is provided by external control logic
                              " and is active only when destination PDMA is enabled.
!MEMW         pin 3;
!DSMG         pin 4;
```

"Output signals. Pin assignments may be changed."

```
!DSMREQ       pin 19;
!DPSHIFT      pin 18;
DPS1, DPS0    pin 17, 16;
!DPNOTMT      pin 15;
!DPSMCYC      pin 14;
IOCHRDY       pin 12;
```

"Field and expression definitions"

DPS = [DPS1, DPS0];

"     DPS is an up/down counter that keeps track of the state of
"     the destination pipe, as a number in the range 0-3.. When
"     DSP=0, the pipe is empty or has one item (these two cases are
"     distinguished by DPNOTMT). When DPS=3, the pipe is full.
"     Externally, DPS controls the output multiplexer of the
"     pipeline. When DPS=0, the first register in the pipeline
"     is selected. When DPS=1, the second register in the
"     pipeline is selected, and so on.

"     The following expressions define when to increment or
"     decrement the DPS counter.

```
CNTUP = (MEMW & !DPSMCYC);     " Got a new item from bus and
                               "   not writing one into the SM.
CNTDN = (DPSMCYC & !MEMW)      " Writing an item into SM and not
                               "   getting a new one from the bus.
CNTHOLD = (!CNTUP & !CNTDN);   " No net change in pipe.
```

"     The following are the four possible values of DPS.

```
CNT0 = [0,0];
CNT1 = [0,1];
CNT2 = [1,0];
CNT3 = [1,1];
```

FIGURE 13A equations

| | | |
|---|---|---|
| DPSHIFT | = ENB_DPMA & MEMW; | " Got a destinstion PDMA word on bus. |
| DPSMCYC | := DSMG; | " Current SM cycle is for destination PDMA. |

DPNOTMT := ENB_DPDMA & MEMW    " Putting something into the pipe.
       # DPCNT > 0                " More than one item in pipe already.
       # DPNOTMT & (DPCNT == 0)   & !DSMCYC;
             " just one item in pipe, but not writing it into SM.

```
DPS   := CNT0 & !ENB_DPDMA
      #  CNT0 & ENB_DPDMA & (DPS == 0) & (!CNTUP # !DPNOTMT)
      #  CNT0 & ENB_DPDMA & (DPS == 1) & CNTDN
      #  CNT1 & ENB_DPDMA & (DPS == 0) & CNTUP & DPNOTMT
      #  CNT1 & ENB_DPDMA & (DPS == 1) & CNTHOLD
      #  CNT1 & ENB_DPDMA & (DPS == 2) & CNTDN
      #  CNT2 & ENB_DPDMA & (DPS == 1) & CNTUP
      #  CNT2 & ENB_DPDMA & (DPS == 2) & CNTHOLD
      #  CNT2 & ENB_DPDMA & (DPS == 3) & CNTDN
      #  CNT3 & ENB_DPDMA & (DPS == 2) & CNTUP
      #  CNT3 & ENB_DPDMA & (DPS == 3) & !CNTDN;
```

DSMREQ     = (DPS ==0) & DPNOTMT & !DPSMCYC & !DSMG
            " 1 word in pipe, no writes granted.
       # (DPS ==1) & !DSMG
            " 2 words in pipe, at most one write granted.
       # (DPS==1) & !DPSMCYC
            " 2 words in pipe, at most one write granted.
       # (DPS >1)
            " 3 or more words in pipe.

!IOCHRDY = (DPS == 2) & !DSMCYC & !DSMG; "Pipeline is almost full,
           " and no space will be freed this cycle or next.
       # (DPS == 3) " Pipeline is full.

end DPIPE;

FIGURE 13B

COMPUTER SYSTEM AND METHOD FOR PIPELINED TRANSFER OF DATA BETWEEN MODULES UTILIZING A SHARED MEMORY AND A PIPELINE HAVING A PLURALITY OF REGISTERS

This application is a divisional of U.S. patent application Ser. No. 08/276,877, filed Jul. 18, 1994, now U.S. Pat. No. 5,444,858, which is a continuation of U.S. patent application Ser. No. 07/964,180, filed Oct. 19, 1992, now abandoned, which is a divisional of U.S. patent application Ser. No. 07/304,053, filed Jan. 30, 1989, now U.S. Pat. No. 5,237,670.

BACKGROUND OF THE INVENTION

1. Field of the Invention

This invention relates to a device and method for performing high-speed block data transfers between modules connected to an input/output (I/O) bus in a computer system.

2. Description of the Prior Art

Several high-performance computer applications transfer a large volume of data between local memories on modules connected by a common, multimaster I/O bus (i.e., a global bus). In such an application, each module can act as a bus master, that is, it can temporarily take over the bus and directly read or write information in any other module which acts as a slave. Examples of such applications include the following:

1. Multiport LAN bridge or router. Each module connects to an external local area network (LAN). Packets arriving at each module are temporarily stored in a local memory on the module. Eventually, packets are forwarded to local memories on other modules, which then forward them to the destination LAN.

2. Multimedia, multiclient file server. One or more modules connect to physical disk drives or other mass storage devices. Other modules connect directly to clients or to shared media (such as LANs) for communicating with clients. File transfers require data to be moved between local memory in the storage-device modules and local memory in the client modules.

3. High-performance distributed-processing workstation. A workstation may contain several processors, each tailored for a specific task. For example, a workstation may have one processor for running an operating system or user "shell", another for performing three-dimensional graphics transformations, and yet another for managing a graphics display. One way to structure such a workstation is to provide a local memory for each processor and to move data from one local memory to another as required for each processor to use the data.

Each of these applications simply requires blocks of data to be moved from one module's local memory to another's. In each case, the global bus provides the connection between modules. Either the source module becomes bus master and writes the block of data to the destination memory, or the destination module becomes bus master and reads the block from the source as follows.

In the prior art, when a bus master requests for a read operation to take place, address, data, and control information flows in two directions:

1) The bus master sends a "read request" signal and an address to the slave.

2) The slave reads the data from its memory at the specified address.

3) The slave sends the data back to the bus master, along with an acknowledgment signal.

In the prior art, a write operation limits the two-way communication between the master and slave:

1) The bus master sends a "write request" signal, an address, and data to the slave.

2) The slave writes the data into its memory at the specified address.

3) The slave sends an acknowledgment signal back to the bus master.

In general, high-performance applications require block transfers on the global bus to be made as quickly as possible, in order to minimize the following effects:

1 Data transfer delay. Most applications require data to be transferred as quickly as possible, because the recipient of the data has nothing to do but wait until it receives the data. Examples are file transfers and packet transfers.

2. Processing overhead. Data transfers on the global bus may delay unrelated processor operations on the sending and/or receiving modules, because the processor may need access to the bus in order to fetch and execute instructions. Examples are any module whose processor does not have a local instruction/data memory or cache.

3. Bus contention. Even if modules have local memories or caches, they may be delayed at times if they need to use the global bus to access an I/O port or other bus-connected resource at the same time that the bus is being used for a block transfer. In addition, other, pending block transfers cannot even begin until the current one completes. For example, a module that is performing local processing may be blocked while trying to read a global flag or send a message on the global bus.

Many different computer I/O bus structures are known in the art. They can be roughly grouped into two categories:

Synchronous bus. A common clock signal, generated at a central point, is distributed to all modules connected to the bus. All control signals and/responses are timed with respect to the clock signal. Likewise, data and address setup and hold times are specified with respect to the clock. Synchronous buses include Multibus, the ISA bus (part of the Industry Standard Architecture for the IBM PC/AT computer), and the recently proposed EISA (Extended Industry Standard Architecture) bus.

Asynchronous bus. This bus has no common clock signal; bus timing is specified relative to the edges of control signals generated by the modules. The PDP-11 Unibus computer is an example from the minicomputer era. More recently, Motorola adopted an asynchronous control approach in the 68000 microprocessor, which was then formalized in the VME bus.

A synchronous bus has simpler control logic and is the natural choice for single-processor (single-bus-master) systems in which the bus clock is simply the processor clock or a derivative of it. On the other hand, it is conventionally believed in the art that an asynchronous bus potentially gives better performance in systems with multiple bus masters.

The conventional argument for better performance with asynchronous buses is as follows. First, assume that the bus must support a wide variety of bus master types and operation speeds (since the processor technology keeps changing). Then, with a synchronous bus, each bus master and slave must synchronize with the bus clock, and a module-to-module transaction on the bus requires two synchronizations. Each synchronization requires an average of 50–100 ns to perform. Part of the synchronization time is the average delay until the next local-processor or bus clock edge (50 ns with a 10 MHz clock) and part of it is the metastability settling time for the synchronizing flip-flops (25 ns is needed with the very best flip-flops).

With an asynchronous bus, no synchronization to the bus or a fixed rate clock is required. Instead, each module on the bus is prepared to deal with asynchronous control signals at any speed up to a predefined maximum. When two processors communicate, one processor generates control signals synchronously with its local clock at its fastest available rate, and the other synchronizes with its own local clock. Only one synchronization occurs, and it takes place at the speed of the destination processor.

With a synchronous bus, total bus bandwidth is calculated as the product of the bus clock frequency and the number of data bits per transfer (word length), divided by the number of clock periods per transfer. Thus, there are three ways to increase the bandwidth of a synchronous bus:

1. Increase the clock frequency.
2. Increase the word length of the data bus.
3. Decrease the number of clock periods per transfer.

For example, the ISA bus has a 6 MHz clock, a 16-bit data bus, and uses 3 clock periods for a typical transfer. Thus, its bandwidth for typical transfers is 32 Mbits/sec. It is desirable to have much higher bandwidths than this.

SUMMARY OF THE INVENTION

Synchronous Global Bus

The chief object of the present invention is to perform fast block transfers between local memories that communicate over a multi-master global bus. Attaining this object requires a choice between synchronous and asynchronous approaches.

The local memory on each module in a typical system is a multiport memory with at least two ports—the global bus interface and a local processor. Additional ports may be provided for I/O device interfaces (e.g., LAN chips or disk controllers). To achieve high speed, the local memory may be built with large, fast, static random-access memory (RAM) chips. Such chips are available with access times in the 15–70 ns range.

As explained above, synchronization times on an asynchronous bus are in the 50–100 ns range, and are twice as long as this on a synchronous bus. In either case, bus synchronization times are longer than the memory access time and thus have the most damaging effect on memory-to-memory block transfer speed.

Therefore, in accordance with the present invention, to speed up block transfers, the module-to-bus synchronization time is reduced to zero. This requires a synchronous bus in which the local memories are synchronized to the bus clock, thus eliminating the need for module-to-bus synchronization. With such an architecture, it is possible to achieve one memory-to-memory transfer per bus clock cycle.

Read vs. Write

As described above, there are two possible ways to transfer a block of data from module A to module B in the type of system under consideration. Either module A can become bus master and write the block of data to module B, or module B can become bus master and read the block from module A.

In accordance with the present invention, the bus master performs a write operation and the order of prior art steps (2) and (3) as described above are exchanged. That is, the slave sends a "data accepted" signal to the master before it has actually finished (or perhaps even started) writing the data into memory. Thus in accordance with the present invention, the system sends an acknowledgement before executing the acknowledged command. So₄ the round trip delay for a transaction is limited to the time that it takes for the slave to detect and respond to the master's "write request" signal, independent of the time that it takes to actually perform a write operation in memory.

Going one step further, in accordance with this invention the round trip delay for the control signals is completely eliminated by pipelining. Instead of generating a "data accepted" signal after each write request, the slave generates a "ready to accept data" signal before each write request, guaranteeing that the data will be accepted immediately.

Write operations have another important advantage over read operations in that broadcast operations are facilitated, so that a single block of data may be transferred from a single source module to multiple destinations. This is useful in the multiport LAN bridge or router application, where a broadcast requirement is inherent. Of course, a data block could be sent to N destinations by performing N individual block transfers, but this consumes N times the bus bandwidth. It is far more efficient for such a data block to appear on the global bus only once, and for each destination to read the data at that time. The control of such an operation is performed most effectively by the source module; a broadcast operation is therefore structured as a special case of a block write.

To combine pipelining with the broadcast write capability, in accordance with the present invention each destination module generates its own "ready to accept data" signal, and the source module sends data only when all destinations are ready.

Addressing

In the prior art, the bus master tells the slave an address for each transfer that it performs. However, individual transfers during a block transfer typically go to successive memory addresses. Therefore, during a block transfer, a slave module only needs to know the starting address for the transfer. This address may be loaded into a counter that is incremented for each individual transfer, so the counter always contains the address for the current transfer.

Therefore, in accordance with the present invention, during a block write, the master (source) module maintains a source-address counter, and the slave (destination) module maintains a destination-address counter. Each counter is initialized to an appropriate address in the corresponding local memory before a block transfer begins, and is incremented for each word transferred.

Number of Clock Periods per Transfer

As stated previously, in accordance with the present invention, the best performance is achieved with a synchronous bus and memory. The best cost/performance ratio is achieved if the memory performs one access (read or write) per clock period, and likewise the global bus performs one transfer per clock. In order to run the memory and the bus at the fastest possible speed without "dead" cycles, data pipelining is used. The control signals are also pipelined, so that the maximum clock speed is limited not by control logic delays, but by memory speeds and data bus delays. The pipelined data transfer path from source module 10 to destination module 11 is illustrated in FIG. 1.

In accordance with the present invention, the memory access occurs in one clock period, as does the transfer from the pipeline 12 in the source module to the pipeline 13 in the destination module. Once a particular data word is read from memory 14 on the source module 10, several clock periods elapse before that word is written into the destination module's memory 15. However, with pipelining, several words are always "in the pipe", so that once the pipeline is filled, a new word is written into the destination 11 during every clock period.

If the source 14 and destination 15 memories are slower than the data bus, techniques such as memory interleaving are optionally used to match the memory bandwidth to the bus bandwidth. For example, if a memory access required two clock periods, then two banks of memory are provided, with successive accesses going to alternate banks.

Bus Width

It is possible to achieve an even higher bandwidth for block transfers. During a block transfer, the source and destination modules in accordance with the present invention keep track of addresses using counters that are incremented once for each word transferred. Since addresses need not be transferred between source and destination modules, in accordance with the present invention, it is possible to use the address bus as an auxiliary data bus during block transfers. For example, consider an implementation using the ISA bus of the PC-AT computer.

The ISA bus, as is known in the art, contains a 16-bit data bus and a 24-bit address bus. During block transfers, in accordance with the present invention the eight high-order bits of the address bus are used to select a destination module, while the sixteen low order bits of the address are treated as "don't-cares". Thus, the destination module conceptually occupies 64 Kbytes ($2^{16}$ bytes) of address space on the bus. Since the low-order address bits are not decoded when the destination module is selected, they can be used for something else—such as data, as explained below.

The word "segment" as used herein denotes the 64 Kbyte region of the address space selected by a particular combination of the eight high-order address bits. Each destination module on the ISA bus is assigned a segment at which it will accept block transfers. Note that this segment does not correspond to "real" (i.e., physical) memory, it is simply a range of addresses decoded by the destination module. When the destination module receives a write command to any address in this segment, it writes the data in local memory at an address specified by the destination-block-address counter, and it increments the counter. The local memory may be larger or smaller than 64 Kbytes, and the destination address in local memory is totally independent of the value of low-order address bus bits during the transfer.

Since the 16 low-order address bus bits are "don't-cares" from the point of view of the destination module's address decoding, they can be used for data. The memories on the source and destination modules can be 32 bits wide, so 32 bits are transferred during each clock period—16 bits on the data bus and 16 bits on the low-order address bus.

With the ISA bus, the block transfer bandwidth using this scheme is 6 MHz times 32 bits per transfer, or 192 Mbits/sec. If the bus clock speed is pushed to 10 MHz (as is possible through other aspects of the invention), the bandwidth is 320 Mbits/sec which is an improvement of a factor of ten over the prior art.

BRIEF DESCRIPTION OF THE DRAWINGS

FIGS. 8, 9, 10 and 11, show timing charts for transfers in accordance with the present invention FIGS. 12A and 12B and 13A and 13B show the pipeline control logic equations in accordance with the present invention.

Identical numbers in various figures denote identical or similar structures.

DETAILED DESCRIPTION OF THE INVENTION

The above described aspects of the present invention are implemented in the preferred embodiment in a method and device called Pipelined Direct Memory Access (PDMA). PDMA is described below in the preferred embodiment, which is in the context of the well known ISA bus.

Definition of Bus Signals

Figure 2:
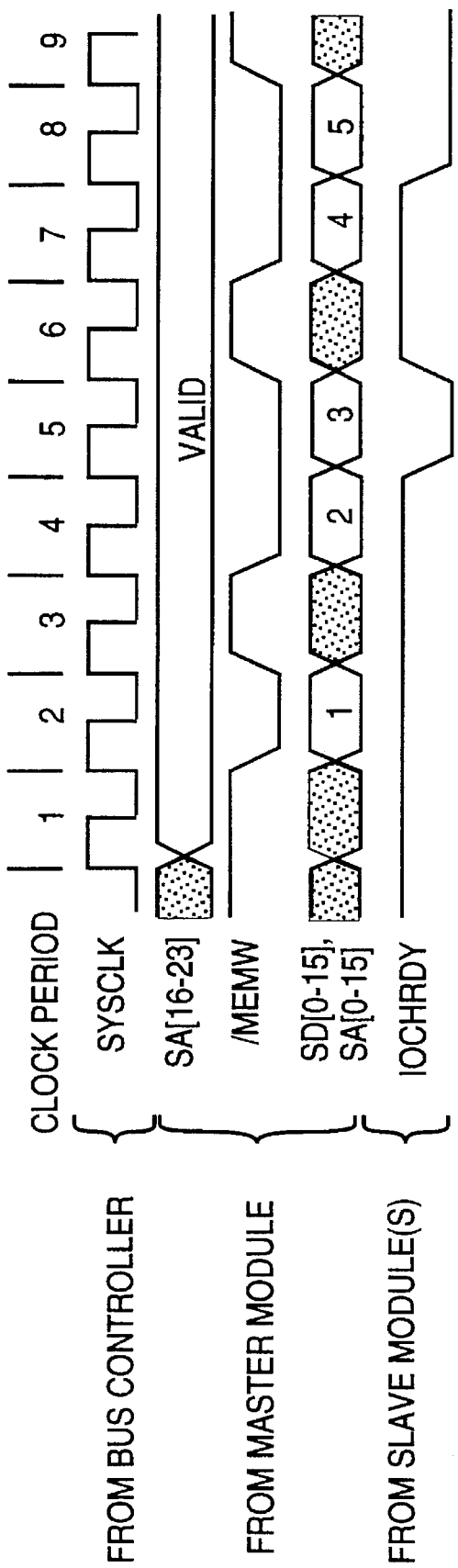
FIG. 2 shows address, data and control signals in accordance with the present invention.

PDMA uses signals (as shown in FIG. 2) that are a subset of the physical signals defined for the ISA bus. However, the logical behavior of these signals as listed below is defined differently for PDMA than it is for conventional ISA operation.

SYSCLK

The system clock signal, generated at one place and distributed to all the modules in the system. Clock frequency is in the range of 6–10 MHz in current ISA bus implementations.

SD[0–15]

The system data bus. The source module drives data onto this bus during PDMA transfers. A particular data word is present on this bus for just one period of SYSCLK.

SA[0–23]

The system address bus. During PDMA transfers, the source module drives SA[16–23] with the segment number of the destination module(s); this value is stable during the entire PDMA transfer. Since address lines SA[0–15] are not decoded, the source module may drive SA[0–15] with data, similar to data on SD[0–15]. A particular data word is present on this bus for just one period of SYSCLK. (Actually, the ISA bus defines signal lines SA[0–19] and LA[17–23]. The LA lines have different timing than SA lines for normal transfers. However, the definitions made here are independent of these differences.)

/MEMW

Memory write signal. The source module drives this signal during PDMA transfers. A low signal (logic 0) indicates that write data is present on SD[0–15] and (optionally) SA[0–15] and must be accepted during this clock period.

IOCHRDY

Ready signal. Destination modules drive this signal during PDMA transfers. A high signal (logic 1) indicates that the destination/module (or modules, in the case of broadcast write operations) will be able to accept a word of data during the next clock period. This is an open-collector line so that, in the case of broadcast, any destination module can pull it low (to logic 0) to prevent a write from occurring in the next clock period.

Note that a prefix of "/" on a signal name indicates an active-low signal. On such signals, a value of logic 0means "true", indicating that the named action should occur. Other signals are active-high, so that logic 1 is true. A signal is said to be asserted when it is set to its active level, and negated when set to the opposite level. As known in the art, the choice between active-low and active-high signals is a matter of implementation convenience and does not affect the behavior of the system. Active levels are chosen in this description in a Way consistent with conventional design practices.

FIG. 2 shows an example of the behavior of these signals. A PDMA block transfer begins during clock period 1, with the source module driving SA[16–23] with the segment number of the destination module for the duration of the transfer. For broadcast write operations, a special "broadcast" destination segment number is used, such that all destination modules (and possibly even the source module itself, acting also as a destination) respond.

In the example of FIG. 2, the source module writes its first word, during clock period 2, by asserting/MEMW and placing the word on SD[0–15] and SA[0–15]. It is allowed to do so because IOCHRDY was asserted during the preceding clock period. The destination module accepts (reads in) the data word at the end of clock period 2.

During clock periods 3–5, the source module is allowed, but not obligated, to write additional words to the destination module(s), and in fact it elects to write only during clock periods 4 and 5. During clock period 5, one or more destination modules negate IOCHRDY, so that the source is not allowed to write during clock period 6.

IOCHRDY is asserted during clock periods 6 and 7, so the source module is allowed to, and does in fact, write during clock periods 7 and 8. IOCHRDY is negated during clock periods 8 and 9, which prevents writes during clock periods 9 and 10.

For the ISA implementation on the PC-AT computer, PDMA transfers either 16-bit words (on SD[0–15]) or 32-bit words (on SD[0–15] and SA[0–15]). As an optional cost-saving measure, only the 16-bit option is provided on certain modules. Theoretically, a control signal on the bus could be used to select between 16- and 32-bit transfers. However, since no such control signal is available in the ISA bus, a different approach is preferred. Each destination module has two segments (actually, ranges of addresses determined by particular values of SA[16–23]) at which it will accept PDMA transfers, one segment for 16-bit transfers and the other for 32-bit transfers.

Properly designed non-PDMA devices on the ISA bus should not be affected by PDMA operations. The segment address value on SA[16–23] during PDMA operations ensures that such devices are not selected and so they ignore the other signals. The means by which a source module becomes bus master is not described here; a variety of conventional means are possible.

Shared Memory Implementation

The shared memory (SM) local to each module is shared between the global bus and devices on the module, such as processors and high-speed I/O interfaces, that also need direct access to the memory. As explained previously, the SM is synchronized to the bus clock, and can be accessed (read or written) once per clock period.

Figure 1:
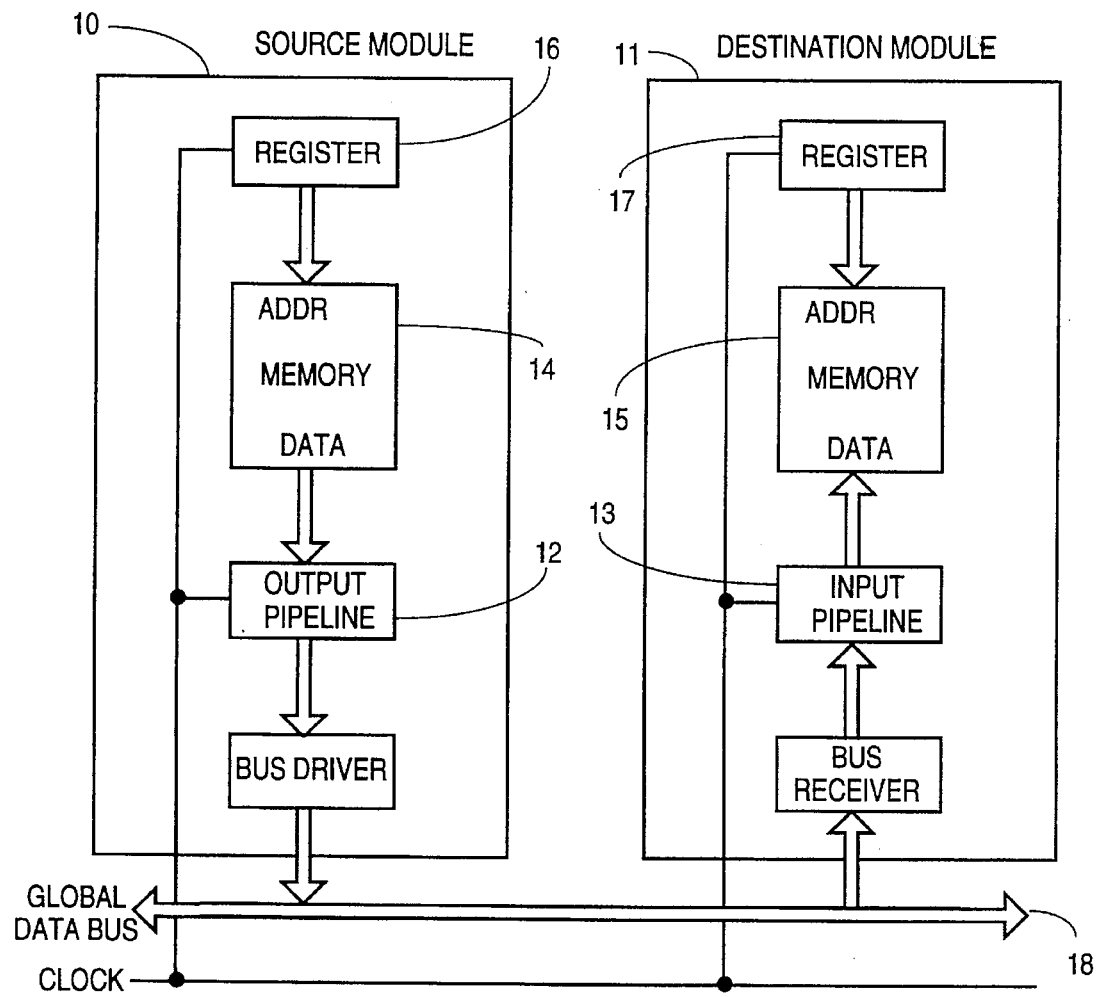
FIG. 1 shows two modules connected by a synchronous global bus in accordance with the present invention.
Figure 3:
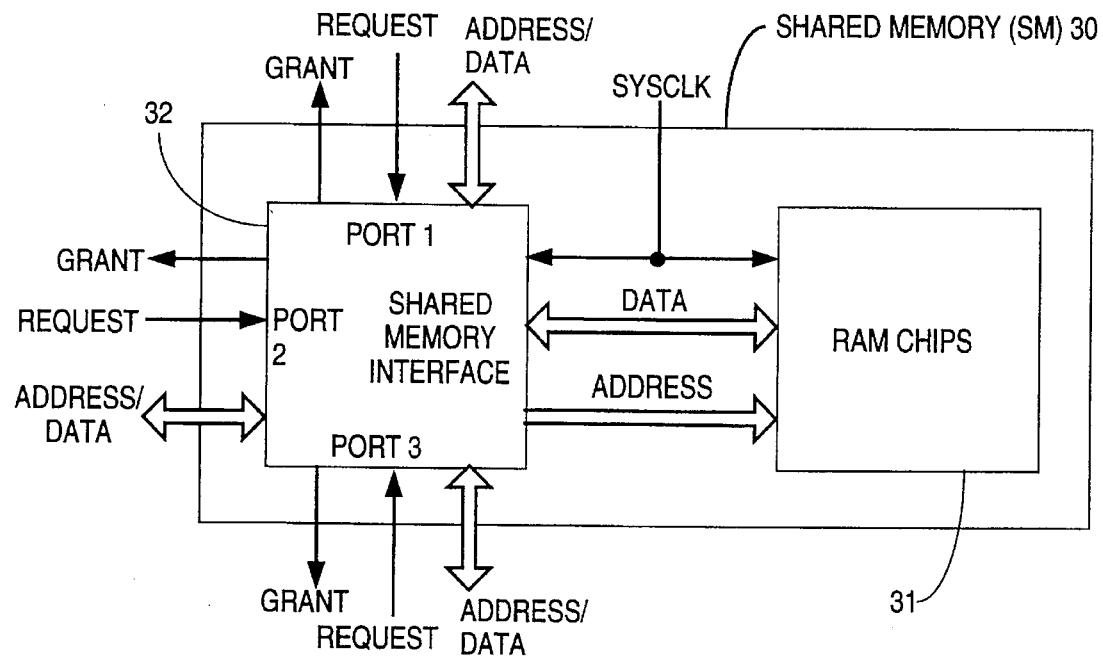
FIG. 3 shows a shared memory structure in accordance with the present invention.

FIG. 3 shows a block diagram of a shared memory 30 (SM) with three ports (port 1, port 2, port 3); one of these ports, such as port 1, is connected through the pipeline registers 12,13 as shown in FIG. 1 to the global bus 18 for PDMA accesses. Each port, port 1, port 2, port 3 (see FIG. 3), has an associated "request" line whereby the control logic for that port requests access. The shared memory interface 32 has arbitration logic (not shown) that accepts requests from the ports and issues "grant" signals at each clock period to indicate which port, if any, may access the SM. A port must complete several steps to access the shared memory:

1) Request access.

2) Wait for access to be granted.

3) Generate address and control signals for memory access.

4) Access the memory (read or write).

In principle, a port can accomplish all of these steps during a single clock period, assuming that no other port is requesting memory access during that same clock period. However, significant combinational logic delays are associated with steps 1–3 above. For example, in typical technologies, the logic circuits that request access, arbitrate among requests, and generate access control signals may each be implemented with a programmable array logic (PAL) circuit having a delay of 25 ns, for a total delay of 75 ns. The memory (RAM) chips 31 themselves (used in step 4 above) may have an access time of 70 ns, so that the minimum clock period needed to accomplish all four steps is 145 ns, more than twice the access time of the memory chips 31 themselves.

Figure 4:
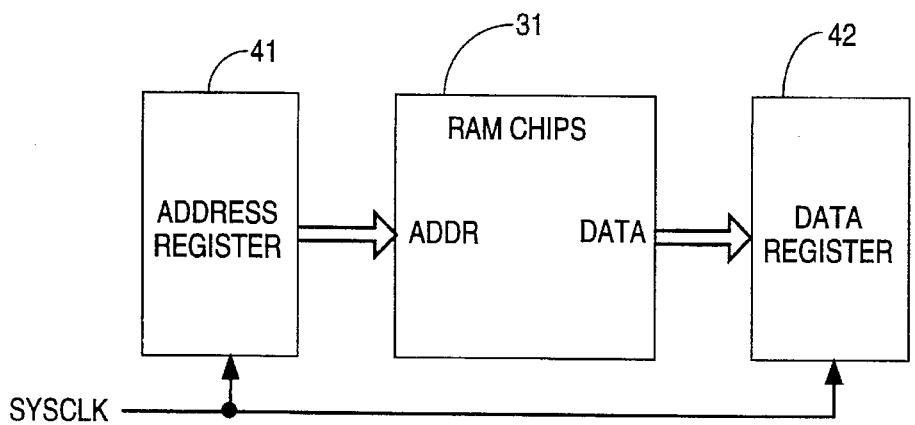
FIG. 4 shows an interface to memory chips for pipelined access in accordance with the present invention.

An alternative to the above-described single-clock embodiment is a pipelined implementation in which requests, arbitration, and control signal generation are performed one or more clock periods before the actual memory access occurs. As shown in FIG. 4 this allows for a very fast and simple interface to the memory (RAM) chips 31 themselves. An address is clocked into the address register 41 at the very beginning of a SYSCLK clock period. A RAM 31 read operation can begin shortly thereafter, as soon as the output of the address register 41 is valid, and the RAM data is saved in the data register 42 at the very end of the clock period. The minimum clock period for this configuration is the sum of the RAM's 31 access time, the address register's 41 clock-to-output delay, and the data register's 42 input-to-clock setup time. In the typical electronic technologies, the total for the last two items is on the order of 20 ns, much less than the 75 ns for three stages of combinational logic (PALs) in a nonpipelined implementation. Write operations may be pipelined similarly, with the address and data being presented at the very beginning of the clock period, and the data being latched into the RAM chips 31 at the very end.

A key element in a pipelined memory interface is to perform the slowest step, the actual RAM chip 31 access, in a single clock period with no "overhead" operations before or after the RAM access itself. Once this is done, there are many different ways to allocate clock periods before the RAM access step (step #4 above) to the other required steps (steps #1, 2, and 3 above). The number of stages in a pipelined implementation is the number of clock periods that it takes for a given operation to be completed. If the delays for the request, arbitration, and control logic are relatively short compared to RAM access time, a two-stage pipelined embodiment is provided in which all of the preliminary steps occur in the single clock period immediately preceding the RAM access. Alternatively, if these steps are slow, a four-stage, fully pipelined embodiment is provided in which each step has its own clock period. Even more stages might be used if steps 1–4 above were subdivided further or partitioned differently.

Figure 5:
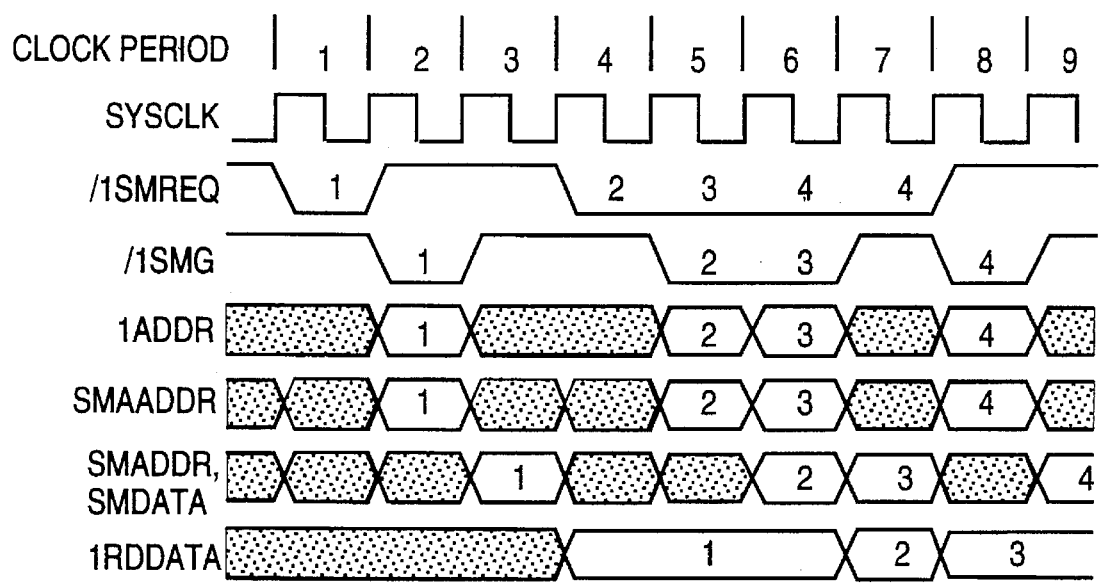
FIG. 5 shows operation of a three staged pipelined shared memory in accordance with the present invention.
Figure 6:
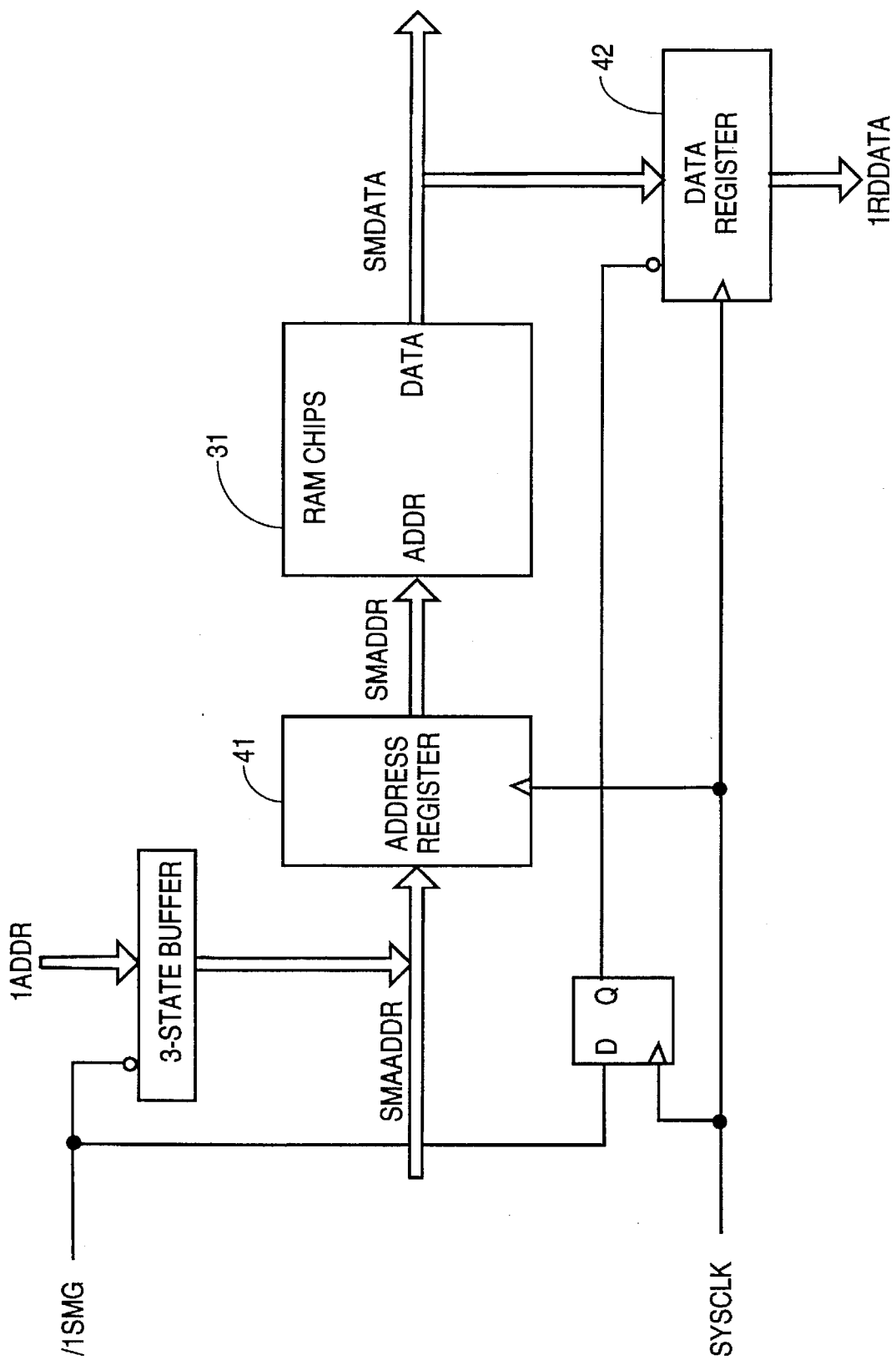
FIG. 6 shows the port structure off a three stage pipelined shared memory in accordance with the present invention

As an example, FIG. 5 shows the timing for read operations in one port of a three-stage (i.e., three clock periods) pipelined implementation. Here step 1 is performed during clock period n, steps 2 and 3 occur during clock period n+1 (assuming access is granted immediately), and step 4 occurs during clock period n+2. The corresponding address and data circuits for a single port ("Port 1") are shown in FIG. 6 for the three stage pipelined implementation.

The following signals are used in this embodiment:
SYSCLK
The system clock signal.
/1SMREQ
Shared memory request signal from port 1. Control circuits for port 1 assert this signal (i.e., set it to 0) at the beginning of a clock period to request access.
/1SMG
Shared-memory grant signal for Port 1. A shared-memory arbiter circuit looks at the request signals for all ports during clock period n, and asserts the grant signal for at most one port at the beginning of clock period n+1 to indicate that access has been granted for the following clock period (n+2). A value of 0 on /1SMG indicates that access has been granted to Port 1.
1ADDR
Port 1 address. This bus contains the address at which Port 1 wishes to access shared memory.
SMAADDR
Shared-memory advance address. During clock period n+1, this bus contains the address at which shared memory will be accessed during clock period n+2. As shown in FIG. 6, the grant signal /1SMG is used to gate 1ADDR onto SMAADDR when access has been granted to Port 1. A similar technique may be used to generate memory-chip 31 control signals, such as read/write, chip selects, and so on, that depend on the grant signals and must be stable for the entire clock period during which the memory is accessed. Such control signals may be generated combinationally during clock period n+1, and used as input to registers that apply stable values to the RAM chips 31 during clock period n+2.
SMADDR
Shared memory address. This bus contains the actual address that is applied to the RAM chips 31 throughout clock period n+2, the address at which memory is accessed.
SMDATA
Shared memory data. This bus contains the data that is read out of the memory during a read cycle, or written into the memory during a write cycle. Only the logic and timing for read cycles are illustrated in FIGS. 5 and 6, but write cycles are similar.
1RDDATA
Port 1 read data. This bus is the output of a register containing the data that was most recently read out of the shared memory on behalf of Port 1. The register is loaded from SMDATA at the end of clock period n+2 only if /1SMG was 0 during clock period n+1, that is, only if Port-1 access was granted for clock period n+2.

Pipeline Registers

As suggested above several clock periods of delay may occur from the time that a port requests access to the SM until the SM operation (read or write) is completed. Therefore, several stages of pipelining are needed to deliver data to, or receive data from, the global bus at the rate of one transfer per clock period.

Referring to FIG. 1, the input 13 and output 12 pipelines, unlike the shared memory, contain registers that are dedicated to the global bus 19 interface. That is, the source pipeline 12 can deliver a word to the global data bus 19 during any clock period, and likewise the destination pipeline 13 can accept a word from the bus during any clock period. Each pipeline 12,13 has a first-in, first-out (FIFO) behavior, that is, it preserves the order of the data written into and read out of it. The pipelines 12,13 are controlled by the following strategies:
Source pipe 12
The source-pipe control circuitry normally requests and uses every available shared-memory (SM) cycle to read data from the SM and puts it into the source pipe. It stops requesting SM cycles only if the source pipe 12 is full or about to become full. The source pipe control circuitry delivers a word to the global bus 19 whenever the source pipe 12 is nonempty and the bus 19 is able to accept a word (i.e., IOCHRDY was asserted during the previous clock period).
Dest. pipe 13
The destination pipe control circuitry puts every word that appears on the global bus 19 into the destination pipe 13. It negates IOCHRDY if the destination pipe 13 is full or about to become full. The destination pipe control circuitry normally requests and uses every available shared-memory (SM) cycle to take data out of the destination pipe 13 and write it into the SM. It stops requesting SM cycles only if the destination pipe 13 is empty or about to become empty.

Figure 7:
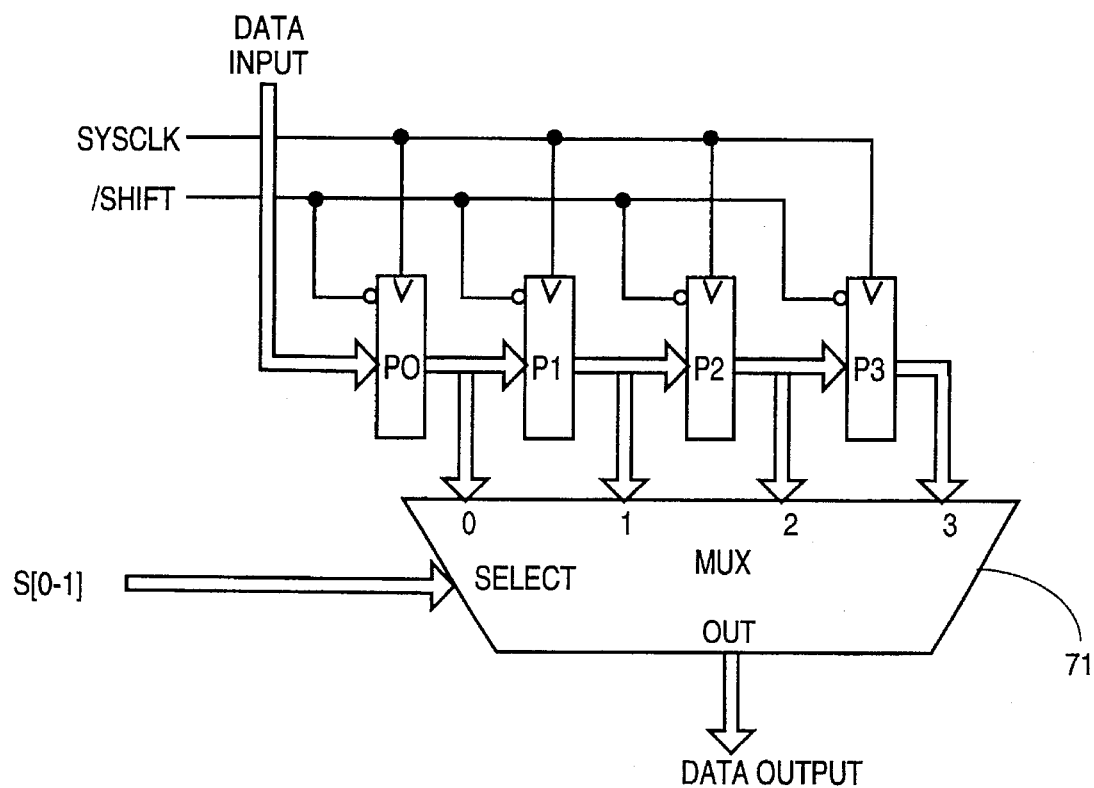
FIG. 7 shows pipeline register structure in accordance with the present invention.

As a specific example, an embodiment in which the source 12 and destination pipes 13 are each four words deep is as follows. FIG. 7 shows the structure of a pipeline; it contains four registers (P0, P1, P2, P3) and a four-input multiplexer 71. At the end of each clock period, existing data in the pipe is shifted one stage (i.e., register) and new data is loaded into the first stage from the data input if and only if /SHIFT is asserted. At all times, the data output of the pipeline is the output of one of the four stages P0–P3, as selected by the 2-bit value on the select inputs, S[1–0]. The pipeline control logic generates signals /SHIFT and S[1–0].

Pipeline Control During PDMA Transfers

FIG. 8 is a system timing diagram for PDMA transfer, including source and destination modules and the global bus (which in this embodiment is an ISA bus). The following signals, buses and registers are included in FIG. 8:
SYSCLK
The system clock signal, generated at one place and present on the ISA bus and all modules.

Source Module Signals

SSMREQ
Shared-memory (SM) request, active-low.
/SSMG
SM grant, active-low.

SSMDATA
　SM data bus, a word being read from the SM.
SOPO–SOP3
　Output pipeline register 0, 1, 2, 3.

Global bus (ISA bus) signals

MEMW Memory write, active-low. Indicates that write data is present on bus during the current clock cycle.
SD[0–15], SA[0–15]
　Data to be written
IOCHRDY
　Ready signal, active-high. Indicates that a write operation is allowed during the next clock cycle.

Destination module signals

DIP0–DIP3
　Input pipeline register 0, 1, 2, 3.
DSMREQ
　Shared memory (SM) request, active low.
DSMG
　SM grant, active-low.
DSMDATA
　SM data bus, a word being written into the SM.

Clock periods are numbered across the top of the drawing in FIG. 8. The other numbers identify the word being transferred; for example, /DSMREQ is asserted during the clock period 7 to request a destination SM cycle to write word 3 of the block transfer. Shaded regions indicate register or bus contents whose values are unknown or "don't care." In particular, numbered, shaded regions in the pipeline registers (SOP[0–3] and DIP[0–3]) indicate data words that have already been used and will not be used again.

FIG. 8 depicts the case including the assumption that both the source and destination SM's are able to grant all of their cycles to the PDMA pipelines, so that once the pipes are filled, a block transfer proceeds at full speed, one clock period per word transferred. As shown, seven clock periods elapse from when the first source SM request is made (during clock period 1) until the requested word is written in the destination (during clock period 7).

Not all of the pipeline registers are used in the case of FIG. 8, because both source and destination operate at full speed. FIG. 9 shows a case where the source module is able to provide SM cycles to the source pipe with no waiting, but the destination module has other ports contending for the SM. Therefore, the destination pipeline must sometimes wait one or more extra clock periods to get an SM cycle (e.g., /DSMG is not asserted during clock periods 7, 9, 11, 12 and 14). In this case, the destination pipe is allowed to fill up, until the destination module is eventually forced to negate IOCHRDY (in clock periods 8 and 9, and again in 12–14) to prevent the destination pipe from overflowing. When this happens, the source pipe continues to fill for a while, but the source module must eventually negate /SSMREQ (in clock periods 10–11, and again in 14–16) to prevent the source pipe from overflowing.

FIG. 10 shows a case where the destination module is able to provide SM cycles to the destination pipe with no waiting, but the source module's output pipe is unable to get all the SM cycles it wants without waiting. In this case, both the source and destination pipes run near empty. Notice that the destination module requests SM cycles (via /DSMREQ) only when new data is present in the destination pipe.

FIG. 11 shows a case where both the source and the destination modules must occasionally wait for SM access.

Pipeline Control Equations

The pipeline control strategy described above and shown in FIGS. 8 through 11 is formalized in a set of logic equations for the source and destination pipeline control logic, and may be implemented using programmable array logic (PAL) circuits. These equations are shown in FIGS. 12A., 12B and 13A, 13B as written in ABEL, an industry-standard language for defining the operation of such circuits.

Note that some of the PAL outputs of FIGS. 12A, 12B and 13A and 13B are combinational (as indicated by an "=" in the defining equation), and some are registered (as indicated by ":="). In particular, the SSMREQ, DSMREQ, IOCHRDY, and. DPSHIFT signals are combinational, and their new values appear in the middle of each clock cycle, shortly after their input values are stable. All other signals are registered, so their values change only at the end of each clock cycle.

Pipeline Control Timing

The pipeline control logic in accordance with the present invention minimizes control-signal propagation delay. For example, consider the requirements of the SM's arbitration logic. During each clock period, the arbitration logic looks at requests (/SMREQ) from its ports and issues a grant signal (/SMG) to indicate which port may access the SM. Therefore, the system's minimum clock period may be limited by the time that it takes for the SPIPE or DPIPE PAL to generate /SSMREQ or /DSMREQ. To minimize the delay of these signals, they are formulated in terms of signals that are generated locally on the corresponding module at the beginning of the clock period.

For example, /SSMREQ is a function of ENB SPDMA, SPS[1–0], /MEMW, /SPSHIFT, and /SSMG, which are all registered outputs, generated on the source module, that become valid at the very beginning of each clock period. Likewise, /DSMREQ is a function of DPS[1–0], /DP-NOTMT, DPSMCYC, and /DSMG, which are all registered outputs, generated on the destination module, that become valid at the very beginning of each clock period.

Optionally, additional information could have been used in the request equations to obtain better pipeline and SM performance, where performance is defined as the number of clock periods required for a given block transfer. For example, the /DSMREQ equation could be modified to "look ahead" and generate an SM request whenever /MEMW is asserted, rather than wait until the corresponding word has been stored in the pipe (refer to the first line of the DSMREQ equation). As a result, a block transfer could complete one clock period sooner than it would have without lookahead. However, since /MEMW is generated on the source module and may experience significant bus delays before reaching the destination module, including such a term in the /DSMREQ equation could increase the minimum system clock period and thereby increase the overall block transfer time. Similarly, the /SSMREQ equation on the source module could look ahead based on the value of IOCHRDY received from the destination module, but again this could increase the minimum system clock period.

Similar reasoning results in the equation for IOCHRDY itself on the destination module. This equation assumes that the source module may or may not assert /MEMW during the current clock period, so that the destination pipe must always have an empty slot available for the word that may be written during this clock period. Theoretically, better bus utilization could be achieved (i.e., IOCHRDY negated less often) if the IOCHRDY equation looked at /MEMW to determine whether or not the source module really is writing a word during the current clock period, but again this would make the delay for IOCHRDY dependent on the bus delay of /MEMW. Since the source module itself looks at IOCHRDY to determine the next value of /MEMW, the result would be a round-trip bus delay from source to destination to source to generate /MEMW. Instead, the control equations are structured so that no control signal must propagate through a round trip path between source and destination modules during a single clock period.

Figure 14:
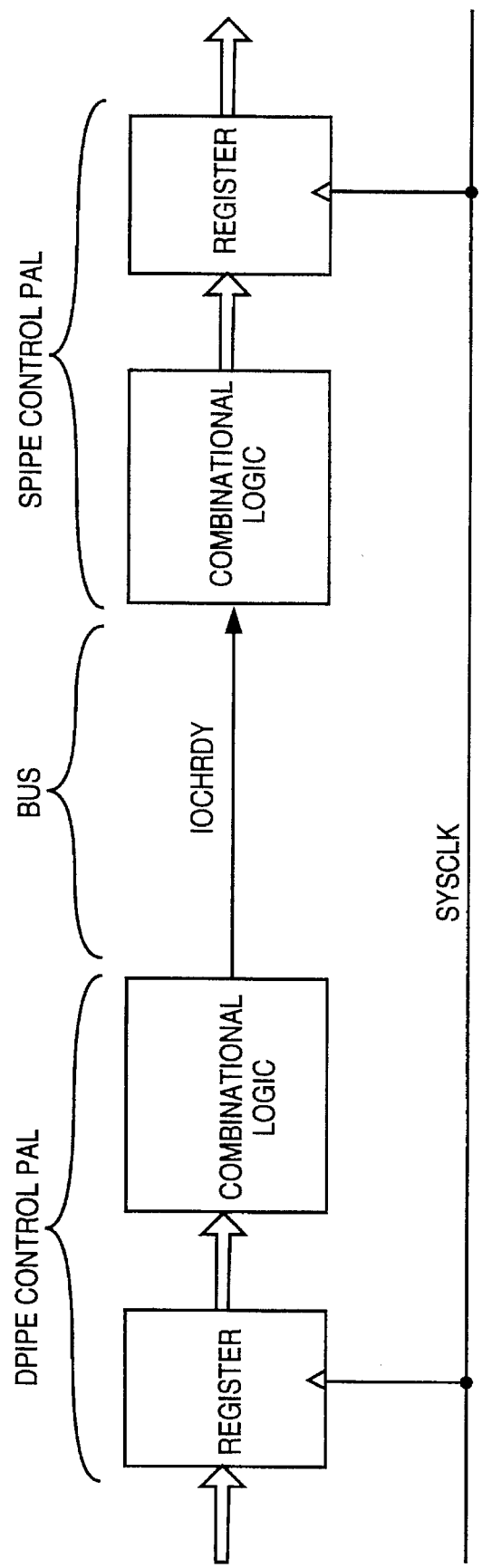
FIGS. 14, 15 and 16 show the worst case signal propagation paths in accordance with the present invention.
Figure 15:
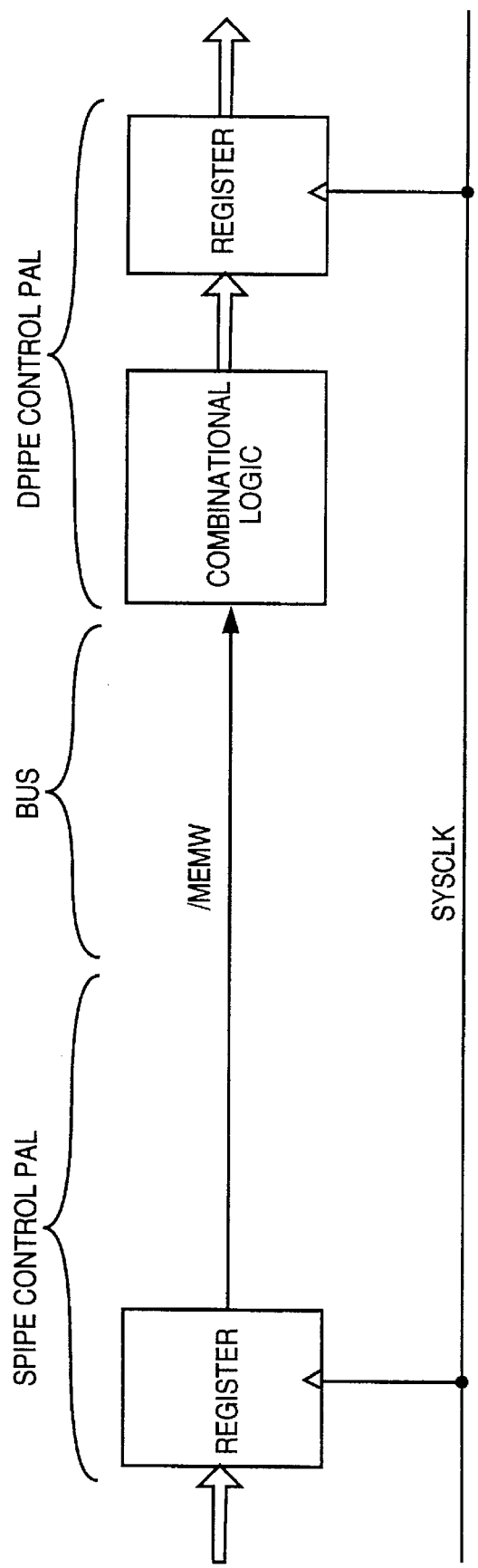
Figure 16:
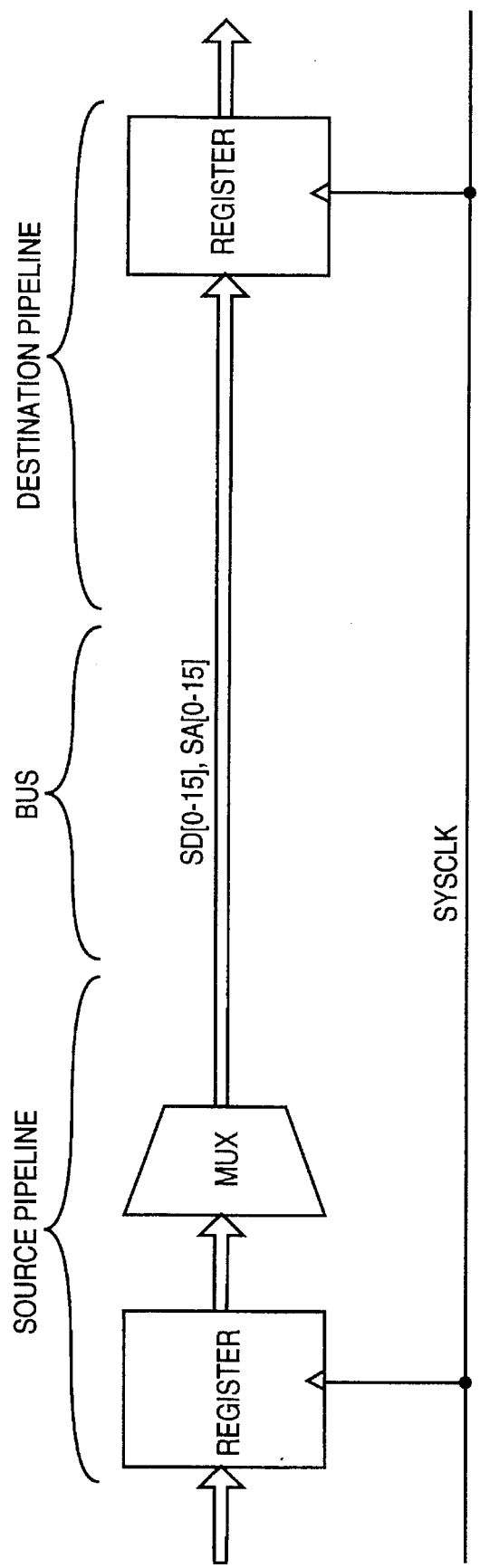

FIGS. 14–16 summarize the worst-case signal propagation paths in the preferred embodiment of PDMA. In each figure, "Bus" delays encompass bus driver and receiver delays as well as propagation delays on the physical bus. FIG. 14 shows the IOCHRDY worst-case propagation delay path. FIG. 15 shows the /MEMW worst-case propagation delay path. FIG. 16 shows the BUS worst-case propagation path. The longest propagation delay is for IOCHRDY (FIG. 14) which is generated combinationally by DPIPE on the destination module and also goes through combinational logic before affecting the registered outputs on SPIPE on the source module.

Pipeline Timing Improvements

The fundamental definitions of the PDMA control signals (/MEMW and IOCHRDY) allow the timing to be further improved in other embodiments of the invention, so that both PDMA control signals and data would experience only a register-to-bus-to-register delay. This requires IOCHRDY output to be registered, and requires a dedicated data pipeline register following the multiplexer in the source pipeline. In addition, faster system clock speeds may also force a higher degree of pipelining in the shared memory, so that the /SSMREQ and /DSMREQ outputs are also registered. Most of the SPIPE and DPIPE equations would be restructured to contain additional lookahead terms. The lengthening of control and data pipeline delays also suggest a corresponding increase in depth for the source and destination data pipelines to achieve optimal performance.

While the above modifications to the preferred embodiment affect the complexity of individual modules and the performance of the bus, they do not change the logical definitions of the bus signals. As a result, it is possible to intermix, in one system, modules with different internal data and control pipeline structures. However, the system clock speed must be slow enough for proper operation of "slow" modules (ones with the delay characteristics of FIGS. 14–16). For fastest possible system clock operation, all modules must have the fully pipelined control and data structure suggested in the previous paragraph.

Note also that it is consistent with the invention to have other types of clocks, such as a multiphase clock. In this case, a single clock period might include a first phase for register propagation delays, a second phase for combinational logic, and a third phase for set up.

The above description of the invention is illustrative and not limiting; other embodiments of the invention will be apparent to those skilled in the art in light of the teachings of this invention.

I claim:

1. A computer system comprising:

a first module;

a second module; and a bus for transferring data between the first and second modules, wherein the first module comprises:

a memory M1; and a pipeline PL1 for transferring data from a port PRT1 of the memory M1 to the bus, the pipeline PL1 having an input for receiving data from the memory M1 and an output for providing data to the bus, wherein the second module comprises:

a memory M2; and a pipeline PL2 for transferring data from the bus to a port PRT2 of the memory M2, the pipeline PL2 having an input for receiving data from the bus and an output for providing data to the memory M2, wherein at least one pipeline PLi (i=1 or 2) of the pipelines PL1 and PL2 comprises a plurality of registers connected to each other in series, a first one of the registers being connected to the input of the pipeline PLi and wherein the pipeline PLi allows shifting data in the registers by one register and loading data from the input of the pipeline PLi into the first one of the registers, and wherein at least one memory Mj (j=1 or 2) of the memories M1 and M2 is a shared memory having a plurality of ports including port PRTj, wherein an access to the memory Mj through a port other than PRTj is allowed to proceed without a data transfer through the pipeline PLj and is allowed to proceed simultaneously with a portion of a data transfer from the memory M1 to the memory M2, the data transfer from M1 to M2 including a data transfer through the port PRTj and the pipeline PLj.

2. The computer system of claim 1 wherein the second module comprises means for asserting a ready signal to indicate that the second module is ready to accept data into the pipeline PL2, the second module negating the ready signal when such negation is needed to prevent the pipeline PL2 from overflowing.

3. The computer system of claim 1 wherein each of the memories M1 and M2 is a shared memory having a plurality of ports.

4. The computer system of claim 3 wherein:

the pipeline PLi is the pipeline PL1; and the pipeline PL2 comprises a plurality of registers connected to each other in series, a first one of the registers of the pipeline PL2 being connected to the input of the pipeline PL2, and the pipeline PL2 allows shifting data in the registers of the pipeline PL2 by one register and loading data from the input of the pipeline PL2 into the first one of the registers of the pipeline PL2.

5. The computer system of claim 1 wherein:

the pipeline PLi is the pipeline PL1; and the first module further comprises a pipeline PL11 for transferring data from the bus to the memory M1, the pipeline PL11 having an input for receiving data from the bus and an output for providing data to the memory M1, the pipeline PL11 comprising a plurality of registers connected in series to each other, a first one of the registers of the pipeline PL11 being connected to the input of the pipeline PL11, wherein the pipeline PL11 allows shifting data in the registers of the pipeline PL11 by one register and loading data from the input of the pipeline PL11 into the first one of the registers of the pipeline PL11.

6. The computer system of claim 5 wherein the pipeline PL11 is responsive to a signal to shift data in the registers of the pipeline PL11 by one register and to load data from the input of the pipeline PL11 into the first one of the registers of the pipeline PL11.

7. The computer system of claim 1 wherein the first module comprises means for asserting a request signal to request an access to the memory M1 through the port PRT1 the request signal being negated when such negation is needed to prevent the pipeline PL1 from overflowing.

8. The computer system of claim 9 wherein the second module comprises means for asserting a ready signal to indicate that the second module is ready to accept data into the pipeline PL2, the second module negating the ready signal when such negation is needed to prevent the pipeline PL2 from overflowing.

9. The computer system of claim 1 wherein the pipeline PLi is responsive to a signal S1 to shift data in the registers of the pipeline PLi by one register and to load data from the input of the pipeline PLi into the first one of the registers of the pipeline PLi.

10. The computer system of claim 9 further comprising means for providing to the pipeline PLi a clock signal such that at an end of a period of the clock signal, data in the pipeline PLi is shifted by one register, and data is loaded from the input of the pipeline PLi into the first one of the registers, if the signal S1 is asserted.

11. The computer system of claim 10 wherein a pipeline PLk which is one of the pipelines PL1 and PL2 and which is different from the pipeline PLi is responsive to a signal S2 to load data from the input of the pipeline PLk into the pipeline PLk such that at an end of a period of the clock signal, data is loaded from the input of the pipeline PLk into the pipeline PLk if the signal S2 is asserted.

12. The computer system of claim 1 wherein the memory Mj is the memory M1.

13. The computer system of claim 12 wherein the pipeline PLi is the pipeline PL2.

14. The computer system of claim 12 wherein an access to the memory M1 through a port other than PRT1 is allowed to proceed simultaneously with a data transfer from the pipeline PL1 to the pipeline PL2 through the bus even when the memory M1 is inaccessible through the port PRT1.

15. The computer system of claim 12 wherein an access to the memory M1 through a port other than PRT1 is allowed to proceed simultaneously with a data transfer from the pipeline PL2 to the port PRT2 even when the memory M1 is inaccessible through the port PRT1.

16. The computer system of claim 15 wherein an access to the memory M1 through a port other than PRT1 is allowed to proceed simultaneously with a data transfer from the pipeline PL1 to the pipeline PL2 through the bus even when the memory M1 is inaccessible through the port PRT1.

17. The computer system of claim 1 wherein the memory Mj is the memory M2.

18. The computer system of claim 17 wherein the pipeline PLi is the pipeline PL1.

19. The computer system of claim 17 wherein an access to the memory M2 through a port other than PRT2 is allowed to proceed simultaneously with a data transfer from the pipeline PL1 to the pipeline PL2 through the bus even when the memory M2 is inaccessible through the port PRT2.

20. The computer system of claim 17 wherein an access to the memory M2 through a port other than PRT2 is allowed to proceed simultaneously with a data transfer from the port PRT1 to the pipeline PL1 even when the memory M2 is inaccessible through the port PRT2.

21. The computer system of claim 20 wherein an access to the memory M2 through a port other than PRT2 is allowed to proceed simultaneously with a data transfer from the pipeline PL1 to the pipeline PL2 through the bus even when the memory M2 is inaccessible through the port PRT2.

22. A method for transferring data from a memory M1 to a memory M2, the method comprising the steps of:

transferring a word of data from a port PRT1 of the memory M1 to an input of a pipeline PL1;

loading said word of data from the input of the pipeline PL1 into the pipeline PL1;

transferring said word of data from the pipeline PL1 onto a bus;

providing said word of data from the bus to an input of a pipeline PL2;

loading said word of data from the input of the pipeline PL2 into the pipeline PL2; and transferring said word of data from the pipeline PL2 to a port PRT2 of the memory M2, wherein at least one pipeline PLi (i 32 1 or 2) of the pipelines PL1 and PL2 comprises a plurality of registers connected to each other in series, the first one of the registers being connected to the input of the pipeline PLi, p1 wherein Loading a word of data into the pipeline PLi comprises (1) loading a word of data from the input of the pipeline PLi into the first one of the registers of the pipeline PLi, and (2) shifting data previously loaded into the pipeline PLi by one register, and wherein at least one memory Mj (j=1 or 2) of the memories M1 and M2 is a shared memory having a plurality of ports including port PRTj, wherein an access to the memory Mj through a port other than PRTj is allowed to proceed without a data transfer through the pipeline PLj and is allowed to proceed simultaneously with a portion of a data transfer from the memory M1 to the memory M2, the data transfer from M1 to M2 including a data transfer through the port PRTj and the pipeline PLj.

23. The method of claim 22 further comprising the steps of:

checking if loading said word of data into the pipeline PL2 could cause the pipeline PL2 to overflow;

if the checking step indicates that loading said word of data into the pipeline PL2 could cause the pipeline PL2 to overflow, then negating a ready signal to indicate that the second module is not ready to accept said word of data into the pipeline PL2.

24. The method of claim 22 wherein each of the memories M1 and M2 is a shared memory comprising a plurality of ports.

25. The method of claim 24 wherein:

the pipeline PLi is the pipeline PL1;

the pipeline PL2 comprises a plurality of registers connected to each other in series, the first one of the registers of the pipeline PL2 being connected to the input of the pipeline PL2; and loading a word of data into the pipeline PL2 comprises (A) loading a word of data from the input of the pipeline PL2 into the first one of the registers of the pipeline PL2, and (B) shifting data previously loaded into the pipeline PL2 by one register.

26. The method of claim 22 further comprising, before the step of transferring a word of data from the port PRT1 to an input of the pipeline PL1, the steps of:

checking if loading said word of data into the pipeline PL1 could cause the pipeline PL1 to overflow; and when the checking step indicates that loading said word of data into the pipeline PL1 could not cause the pipeline PL1 to overflow, then asserting a request signal to request an access to the memory M1 through the port PRT1.

27. The method of claim 26 further comprising the steps of:

(A) checking if loading said word of data into the pipeline PL2 could cause the pipeline PL2 to overflow;

(B) if the step (A) indicates that loading said word of data into the pipeline PL2 could cause the pipeline PL2 to overflow, then negating a ready signal to indicate that the second module is not ready to accept said word of data into the pipeline PL2.

28. The method of claim 22 wherein loading a word of data into the pipeline PLi further comprises the step of asserting a signal S1, and wherein the steps (1) and (2) are performed in response to the signal S1 being asserted.

29. The method of claim 28 further comprising the step of providing a clock signal to the pipeline PLi such that the steps (1) and (2) are performed on an edge of the clock signal.

30. The method of claim 29 wherein said edge of the clock signal is a rising edge.

31. The method of claim 22 wherein the memory Mj is the memory M1.

32. The method of claim 31 wherein the pipeline PLi is the pipeline PL2.

33. The method of claim 31 wherein an access to the memory M1 through a port other than PRT1 is allowed to proceed simultaneously with the steps of transferring said word of data from the pipeline PL1 onto the bus, providing said word of data from the bus to the input of the pipeline PL2, and loading said word of data from the input of the pipeline PL2 into the pipeline PL2, even when the memory M1 is inaccessible through the port PRT1.

34. The method of claim 31 wherein an access to the memory M1 through a port other than PRT1 is allowed to proceed simultaneously with transferring said word of data from the pipeline PL2 to the port PRT2 even when the memory M1 is inaccessible through the port PRT1.

35. The method of claim 34 wherein an access to the memory M1 through a port other than PRT1 is allowed to proceed simultaneously with the steps of transferring said word of data from the pipeline PL1 onto the bus, providing said word of data from the bus to the input of the pipeline PL2, and loading said word of data from the input of the pipeline PL2 into the pipeline PL2, even when the memory M1 is inaccessible through the port PRT1.

36. The method of claim 22 wherein the memory Mj is the memory M2.

37. The method of claim 36 wherein the pipeline PLi is the pipeline PL1.

38. The method of claim 36 wherein an access to the memory M2 through a port other than PRT2 is allowed to proceed simultaneously with the steps of transferring said word of data from the pipeline PL1 onto the bus, providing said word of data from the bus to the input of the pipeline PL2, and loading said word of data from the input of the pipeline PL2 into the pipeline PL2, even when the memory M2 is inaccessible through the port PRT2.

39. The method of claim 36 wherein an access to the memory M2 through a port other than PRT2 is allowed to proceed simultaneously with transferring said word of data from the port PRT1 to the input of the pipeline PL1 even when the memory M2 is inaccessible through the port PRT2.

40. The method of claim 39 wherein an access to the memory M2 through a port other than PRT2 is allowed to proceed simultaneously with the steps of transferring said word of data from the pipeline PL1 onto the bus, providing said word of data from the bus to the input of the pipeline PL2, and loading said word of data from the input of the pipeline PL2 into the pipeline PL2, even when the memory M2 is inaccessible through the port PRT2.

* * * * *

UNITED STATES PATENT AND TRADEMARK OFFICE
CERTIFICATE OF CORRECTION

PATENT NO. : 5,577,229

DATED : November 19, 1996

INVENTOR(S) : John F. Wakerly

It is certified that error appears in the above-indentified patent and that said Letters Patent is hereby corrected as shown below:

Col. 4, line 11,
  Delete "So$_4$" and insert --So,--;

Col. 7, line 18,
  Delete "Omeans" and insert --0 means--;

Col. 11, line 8,
  Delete "MEMW" and insert --/MEMW--;

Col. 11, line 20,
  Delete "DSMREQ" and insert --/DSMREQ--;

Col. 11, line 22,
  Delete "DSMG" and insert --/DSMG--;

UNITED STATES PATENT AND TRADEMARK OFFICE
CERTIFICATE OF CORRECTION

PATENT NO. : 5,577,229
DATED : November 19, 1996
INVENTOR(S) : John F. Wakerly

It is certified that error appears in the above-indentified patent and that said Letters Patent is hereby corrected as shown below:

Col. 12, line 7,
   Delete "12A." and insert --12A--;

Col. 12, line 34,
   Delete "ENBSPDMA" and insert --ENB_SPDMA--; and

Col. 16, line 17,
   Delete "32" and insert -- = --.

Signed and Sealed this

Eighteenth Day of March, 1997

Attest:

BRUCE LEHMAN

Attesting Officer

Commissioner of Patents and Trademarks